(12) United States Patent
Tanaka et al.

(10) Patent No.: US 9,416,707 B2
(45) Date of Patent: Aug. 16, 2016

(54) DIESEL ENGINE

(71) Applicant: KUBOTA Corporation, Osaka-shi, Osaka (JP)

(72) Inventors: Tamon Tanaka, Osaka (JP); Koichi Funaki, Osaka (JP); Hirozumi Kuwabara, Osaka (JP); Soichiro Watanabe, Osaka (JP); Yoshitaka Taira, Osaka (JP); Tetsuya Kosaka, Osaka (JP); Satoshi Inayama, Osaka (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/466,013

(22) Filed: Aug. 22, 2014

(65) Prior Publication Data

US 2015/0089930 A1    Apr. 2, 2015

(30) Foreign Application Priority Data

Sep. 30, 2013  (JP) .................................. 2013-204997
Sep. 30, 2013  (JP) .................................. 2013-204998

(51) Int. Cl.
*F01N 3/035* (2006.01)
*F01N 3/20* (2006.01)
(Continued)

(52) U.S. Cl.
CPC ................ *F01N 3/035* (2013.01); *F01N 3/021* (2013.01); *F01N 3/2066* (2013.01);
(Continued)

(58) Field of Classification Search
CPC ....... F01N 3/021; F01N 3/2066; F01N 3/208; F01N 13/009; F01N 13/1811; F01N 2250/02; F01N 2340/04; F01N 2470/18; F01N 2610/02; F01N 2610/1453

USPC ............ 60/286, 295, 296, 297, 301, 311, 322
See application file for complete search history.

(56) References Cited

U.S. PATENT DOCUMENTS 8,764,866 B2 * 7/2014 Mitsuda .................. B05D 1/40
                                                55/385.3
2010/0031644 A1   2/2010 Keane et al.
(Continued)

FOREIGN PATENT DOCUMENTS

EP    0226088 A1   6/1987
EP    1026375 A2   8/2000
(Continued)

OTHER PUBLICATIONS

Extended European Search Report issued Feb. 2, 2015 in EP Application No. 14180445.0.
(Continued)

*Primary Examiner* — Jorge Leon, Jr.
(74) *Attorney, Agent, or Firm* — Panitch Schwarze Belisario & Nadel LLP

(57) ABSTRACT

It is an object of the present invention to provide a diesel engine in which a DPF case and an SCR catalyst case can be placed compactly. The diesel engine includes an engine body, the DPF case and the SCR catalyst case, a DPF is accommodated in the DPF case, an SCR catalyst is accommodated in the SCR catalyst case, and the DPF case and the SCR catalyst case are mounted on the engine body. The SCR catalyst case is placed in a direction which extends along the DPF case. The DPF case is placed directly above a flywheel housing and right behind a cylinder head cover, and the SCR catalyst case is placed directly above the cylinder head cover.

20 Claims, 16 Drawing Sheets

(51) Int. Cl.
*F01N 13/18* (2010.01)
*F01N 3/021* (2006.01)
*F01N 13/00* (2010.01)

(52) U.S. Cl.
CPC ......... *F01N 13/009* (2014.06); *F01N 13/1805* (2013.01); *F01N 2340/04* (2013.01); *F01N 2590/08* (2013.01); *F01N 2610/02* (2013.01); *F01N 2610/1453* (2013.01); *Y02T 10/24* (2013.01)

(56) References Cited

U.S. PATENT DOCUMENTS

| | | | | |
|---|---|---|---|---|
| 2010/0186394 A1* | 7/2010 | Harrison | ................ | F01N 3/103 60/299 |
| 2011/0167808 A1* | 7/2011 | Kosaka | ............... | F01N 13/1822 60/311 |
| 2012/0247861 A1 | 10/2012 | Mizuno et al. | | |
| 2013/0160428 A1* | 6/2013 | Okuda | ................ | F01N 13/1805 60/272 |
| 2013/0343853 A1 | 12/2013 | Sato et al. | | |
| 2014/0102823 A1* | 4/2014 | Mori | ..................... | E02F 9/0866 180/309 |
| 2014/0238767 A1* | 8/2014 | Numa | .................. | F01N 3/2066 180/309 |
| 2014/0291058 A1* | 10/2014 | Nakagami | ............. | E02F 9/0891 180/309 |
| 2014/0299401 A1* | 10/2014 | Nakagami | ............. | E02F 9/0866 180/309 |
| 2014/0326527 A1* | 11/2014 | Harada | ................. | E02F 9/0866 180/309 |
| 2014/0348716 A1* | 11/2014 | Park | ...................... | F01N 3/2066 422/171 |
| 2015/0240447 A1* | 8/2015 | Homma | ................ | E02F 9/0866 180/309 |

FOREIGN PATENT DOCUMENTS

| | | | | |
|---|---|---|---|---|
| EP | 2518290 A1 | 10/2012 | | |
| JP | 2009150394 A | 7/2009 | | |
| JP | 2011-032946 A | 2/2011 | | |
| JP | 2012077622 A | 4/2012 | | |
| JP | 2013104394 A | 5/2013 | | |
| JP | 2013160146 A | 8/2013 | | |
| JP | 2013189894 A | 9/2013 | | |
| JP | WO 2014097495 A1 * | 6/2014 | ............ | E02F 9/0866 |
| JP | WO 2014125622 A1 * | 8/2014 | ............ | E02F 9/0866 |
| KR | WO 2013103169 A1 * | 7/2013 | ............ | F01N 3/2066 |
| WO | 2008136203 A1 | 11/2008 | | |
| WO | 2011152306 A1 | 12/2011 | | |

OTHER PUBLICATIONS

Office Action issued Feb. 23, 2016 in JP Application No. 2013204997.

Office Action issued Feb. 23, 2016 in JP Application No. 2013204998.

* cited by examiner

DIESEL ENGINE

BACKGROUND OF THE INVENTION

The present invention relates to a diesel engine, and more particularly, to a diesel engine in which an engine body, a DPF case and an SCR catalyst case can be placed compactly.

As conventional diesel engines, there is a diesel engine including an engine body, a DPF case and an SCR catalyst case, in which a DPF is accommodated in the DPF case, and an SCR catalyst is accommodated in the SCR catalyst case (see Japanese Patent Application No. 2011-32946 (FIG. 1) for example).

The engine of this kind has a merit that the DPF traps PM in exhaust gas, and it is possible to reduce NOx in exhaust gas by the SCR catalyst.

However, the diesel engine of Japanese Patent Application No. 2011-32946 has a problem because the engine body, the DPF case and the SCR catalyst case are placed such that they stay away from one another.

The engine body, the DPF case and the SCR catalyst case cannot be placed compactly.

According to the diesel engine of Japanese Patent Application No. 2011-32946, since the engine body, the DPF case and the SCR catalyst case are placed such that they stay away from one another, the engine body, the DPF case and the SCR catalyst case cannot be placed compactly.

BRIEF SUMMARY OF THE INVENTION

It is an object of the present invention to provide a diesel engine in which an engine body, a DPF case and an SCR catalyst case can be placed compactly.

As illustrated in FIG. 1 to 3, 10 to 12 or 16, a diesel engine including an engine body 1, a DPF case 2 and an SCR catalyst case 3, in which a DPF 4 is accommodated in the DPF case 2 and an SCR catalyst 5 is accommodated in the SCR catalyst case 3, wherein the DPF case 2 and the SCR catalyst case 3 are mounted on the engine body 1.

The invention has the following effects. It is possible to compactly place an engine body, a DPF case and an SCR catalyst case.

As illustrated in FIG. 1 to 3, 10 to 12 or 16, since the DPF case 2 and the SCR catalyst case 3 are mounted on the engine body 1, it is possible to compactly place the engine body 1, the DPF case 2 and the SCR catalyst case 3.

It becomes easy to mount elements on an engine-mounting machine.

As illustrated in FIG. 1 to 3, 10 to 12 or 16, since the DPF case 2 and the SCR catalyst case 3 are mounted on the engine body 1, if the engine body 1 is mounted on the engine-mounting machine, the DPF case 2 and the SCR catalyst case 3 are also collectively mounted on the engine-mounting machine. Therefore, it becomes easy to mount these components on the engine-mounting machine.

It is possible to compactly place the engine body, the DPF case and the SCR catalyst case.

As illustrated in FIG. 1, 10 or 16, the SCR catalyst case 3 is placed in a direction which extends along the DPF case 2. Therefore, the SCR catalyst case 3 does not intersect with the DPF case 2, and it is possible to compactly place the engine body 1, the DPF case 2 and the SCR catalyst case 3.

It is possible to compactly place the engine body, the DPF case and the SCR catalyst case.

As illustrated in FIG. 1 to 3, 10 to 12 or 16, the DPF case 2 is placed directly above the flywheel housing 6 and right behind the cylinder head cover 7, and the SCR catalyst case 3 is placed directly above the cylinder head cover 7. Therefore, by effectively utilizing an empty space in the engine body 1, it is possible to compactly place the engine body 1, the DPF case 2 and the SCR catalyst case 3.

It is possible to strongly support the DPF case and the SCR catalyst case on the engine body.

As illustrated in FIGS. 1 to 3, the DPF support stage 10 is provided on an upper portion of the flywheel housing 6, the flywheel housing 6 is a cast placed on a rear end of the cylinder block 12, the DPF support stage 10 is a built-up portion of the flywheel housing 6 by casting, and the DPF base bracket 8 is placed and mounted on the DPF support stage 10. Therefore, it is possible to strongly support the DPF case 2 on the engine body 1 by the DPF support stage 10 having high rigidity.

Further, an upper end of the SCR support stay 11 is fixed to the SCR base bracket 9, and a lower end of the SCR support stay 11 is fixed to an engine body part 13 located at a position higher than the cylinder block 12. Therefore, it is possible to shorten a vertical length of the SCR support stay 11, and it is possible to strongly support the SCR catalyst case 3 on the engine body 1 through the SCR support stay 11 having high rigidity.

It is possible to strongly support the DPF case and the SCR catalyst case on the engine body.

As illustrated in FIG. 10 to 12 or 16, the DPF support stage 10 is provided on an upper portion of the flywheel housing 6, the DPF support stage 10 is a built-up portion of the flywheel housing 6 by casting, and the DPF base bracket 8 is placed and mounted on the DPF support stage 10. Therefore, it is possible to strongly support the DPF case 2 on the engine body 1 by the DPF support stage 10 having high rigidity.

Further, a lower portion of the SCR support stay 11 is fixed to the flywheel housing 6 and the DPF base bracket 8, and the SCR base bracket 9 is fixed to an upper end of the SCR support stay 11. Therefore, the SCR catalyst case 3 is supported on the flywheel housing 6 having high rigidity through the SCR support stay 11, the SCR catalyst case 3 is also supported on the DPF support stage 10 having high rigidity through the SCR support stay 11 and the DPF base bracket 8, and it is possible to strongly support the DPF case 2 on the engine body 1.

It is possible to restrain a connector from being damaged by vibration.

As illustrated in FIG. 16, the diesel engine further includes a connector mounting plate 28, the connector mounting plate 28 is mounted on the SCR support stay 11, and a connector 32 which is an electronic component is mounted on the connector mounting plate 28. Therefore, the connector mounting plate 28 does not easy vibrate, and it is possible to restrain the connector 32 from being damaged by vibration.

It is possible to compactly place a straight pipe portion of an exhaust gas relay pipe, the DPF case and the SCR catalyst case.

As illustrated in FIG. 4 or 13, the straight pipe portion 14a of the exhaust gas relay pipe 14 is placed in a direction which extends along the DPF case 2 and the SCR catalyst case 3. Therefore, the straight pipe portion 14a of the exhaust gas relay pipe 14, the DPF case 2 and the SCR catalyst case 3 do not intersect with each other, and it is possible to compactly place the straight pipe portion 14a of the exhaust gas relay pipe 14, the DPF case 2 and the SCR catalyst case 3.

It is possible to avoid inconvenience that crystal of urea aqueous solution conglutinates in the straight pipe portion.

As illustrated in FIG. 7 or 14, the straight pipe portion 14a of the exhaust gas relay pipe 14 is placed directly above the DPF case 2. As shown in FIG. 1 or 10, as viewed in a direction parallel to a crankshaft center axis 19 of the engine body 1, a highest portion 2b of a peripheral surface of the DPF case 2 is placed at a position lower than a lowest portion 3b of a peripheral surface of the SCR catalyst case 3, and the straight pipe portion 14a of the exhaust gas relay pipe 14 is placed at a position superposing on a highest portion 3c of the peripheral surface of the SCR catalyst case 3. Therefore, the straight pipe portion 14a of the exhaust gas relay pipe 14 is sufficiently separated away from the highest portion 2b of the peripheral surface of the DPF case 2, it is possible to prevent the straight pipe portion 14a from being excessively heated by radiation of the DPF case 2, and it is possible to avoid inconvenience that crystal of urea aqueous solution 18 conglutinates in the straight pipe portion 14a.

It is possible to keep the height of the engine low.

As illustrated in FIG. 1 or 10, the straight pipe portion 14a of the exhaust gas relay pipe 14 is placed at a position superposing on a highest portion 3c of the peripheral surface of the SCR catalyst case 3. Therefore, the straight pipe portion 14a of the exhaust gas relay pipe 14 does not largely protrude upward of the highest portion 3c of the peripheral surface of the SCR catalyst case 3, and it is possible to keep the height of the engine low.

It is possible to prevent distortion of various portions of pipes.

As illustrated in FIG. 1 or 10, the diesel engine further includes slip joint portions 17, the slip joint portions 17 are placed on both ends of the exhaust gas relay pipe 14, a pipe portion 17b is fitted into a pipe portion 17a such that the pipe portions 17a and 17b can expand, contract and slide in a longitudinal direction of the pipe slip joint portion 17, as illustrated in FIG. 9, and the pipe portions 17a and 17b are fixed by a fastening portion 17c at predetermined expansion, contraction and sliding positions. Therefore, after the DPF case 2 and the SCR catalyst case 3 are mounted on the engine body 1, if a fastened degree of the slip joint portion 17 is loosened, it is possible to release stress in various portions of the pipes caused by twist or positional deviation, and to prevent distortion of the various portions of the pipes.

It is possible to prevent pressure of exhaust gas from increasing.

As illustrated in FIG. 4 or 13, by structures of an exhaust gas discharging pipe 2a of the DPF case 2, an exhaust gas introducing pipe 3a of the SCR catalyst case 3 and the exhaust gas relay pipe 14, it is possible to make exhaust gas 15 pass through the SCR catalyst case 3 from the DPF case 2 with small resistance, and it is possible to prevent pressure of exhaust gas from increasing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIGS. 1 to 9 are diagrams for describing a diesel engine according to a first embodiment of the present invention, and FIGS. 10 to 16 are diagrams for describing a diesel engine according to a second embodiment of the invention. In these embodiments, vertical type straight multicylinder diesel engines will be described.

A general outline of the engine of the first embodiment is as follows.

Figure 2:
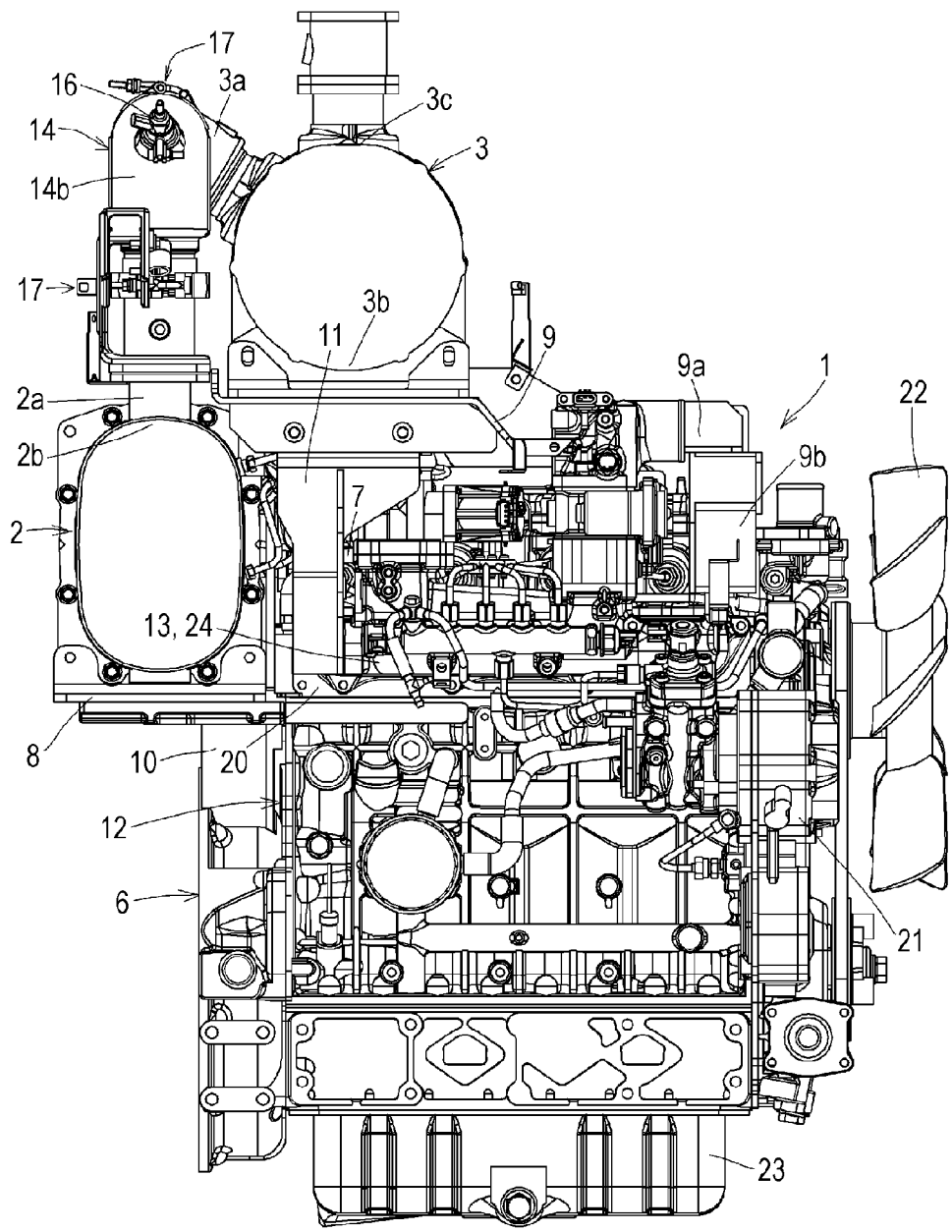
FIG. 2 is a left side view of the engine shown in FIG. 1.

As shown in FIG. 2, a cylinder head 20 is assembled into an upper portion of a cylinder block 12, a cylinder head cover 7 is assembled into an upper portion of the cylinder head 20, a water pump case 21 is assembled into a front portion of the cylinder block 12, an engine cooling fan 22 is placed in front of the water pump case 21, a flywheel housing 6 is placed on a rear portion of the cylinder block 12, and an oil pan 23 is assembled into a lower portion of the cylinder block 12.

Figure 3:
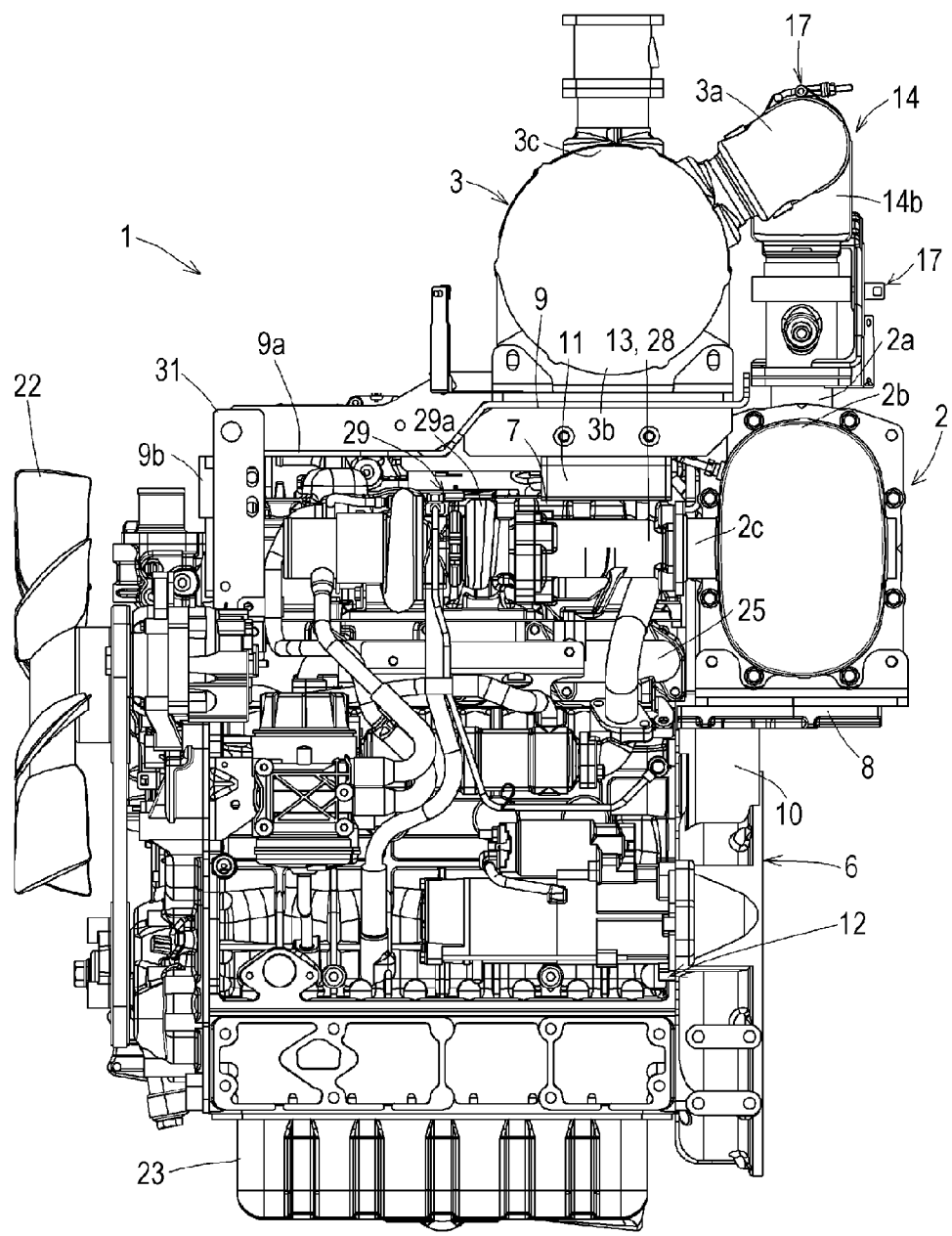
FIG. 3 is a right side view of the engine shown in FIG. 1.

An intake manifold 24 is assembled into one of lateral sides of the cylinder head 20 as shown in FIG. 2, and an exhaust manifold 25 is assembled into the other lateral side as shown in FIG. 3.

Figure 1:
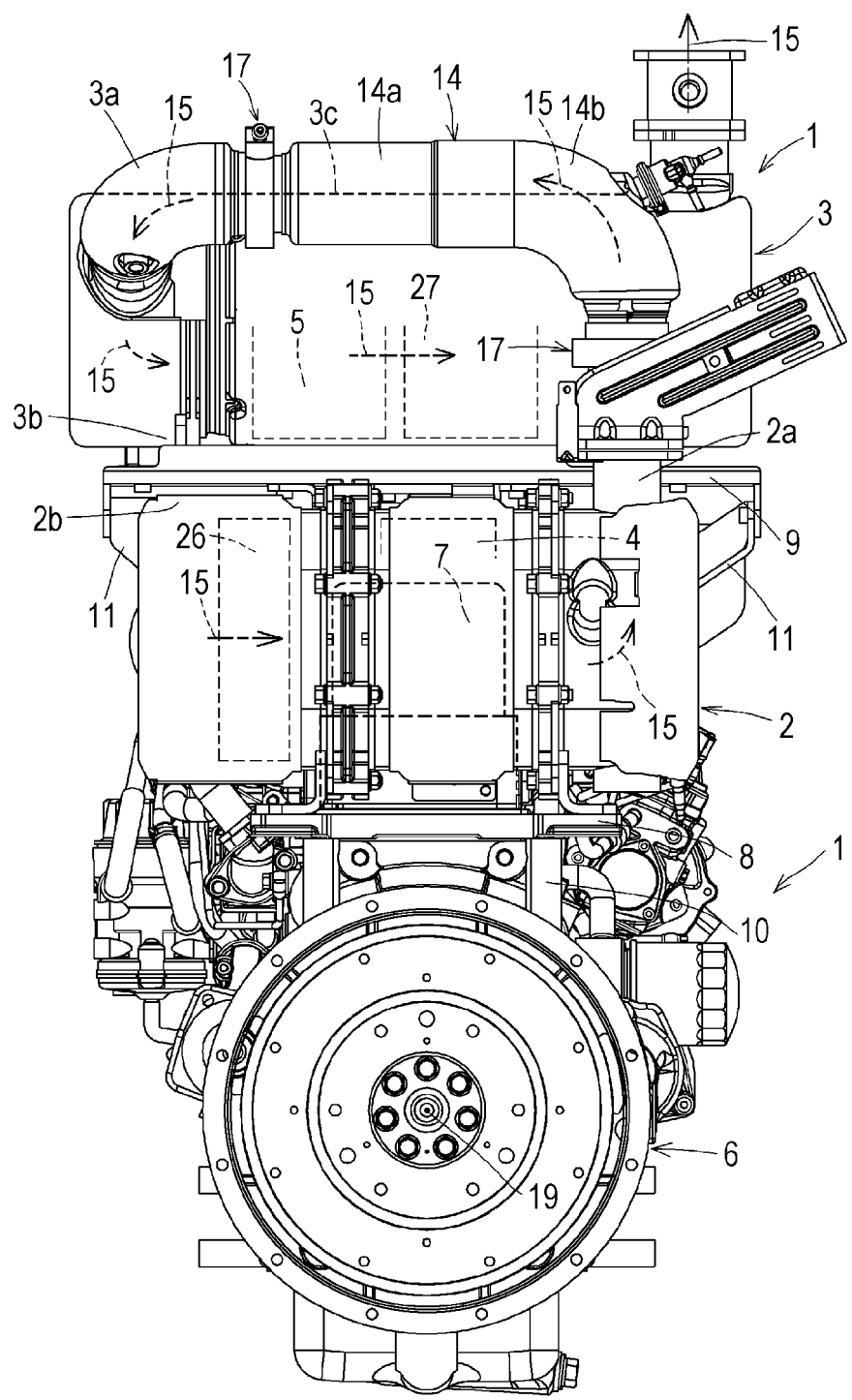
FIG. 1 is a back view of a diesel engine according to a first embodiment of the present invention.

As shown in FIGS. 1 to 3, the diesel engine includes an engine body 1, a DPF case 2 and an SCR catalyst case 3.

A DPF 4 is accommodated in the DPF case 2, and an SCR catalyst 5 is accommodated in the SCR catalyst case 3.

The DPF case 2 and the SCR catalyst case 3 are mounted on the engine body 1.

As shown in FIG. 1, a DOC 26 is accommodated in the DPF case 2 on an upstream side, and the DPF 4 is accommodated in the DPF case 2 on a downstream side. The DPF is an abbreviation of a diesel particulate filter, and the DOC is an abbreviation of a diesel oxidation catalyst. The SCR catalyst 5 is accommodated in the SCR catalyst case 3 on the upstream side, and an oxidation catalyst 27 is accommodated in the SCR catalyst case 3 on the downstream side, thereby preventing ammonia from slipping. The SCR is an abbreviation of selective catalytic reduction.

As shown in FIG. 1, the SCR catalyst case 3 is placed in a direction which extends along the DPF case 2.

As shown in FIGS. 1 to 3, the flywheel housing 6 is placed on a rear end of the cylinder block 12 of the engine body 1, and the cylinder head cover 7 is placed on an upper portion of the cylinder head 20 of an upper portion of the cylinder block 12 of the engine body 1.

The DPF case 2 is placed directly above the flywheel housing 6 and right behind the cylinder head cover 7.

The SCR catalyst case 3 is placed directly above the cylinder head cover 7.

As shown in FIGS. 1 to 3, the diesel engine includes a DPF base bracket 8, an SCR base bracket 9, a DPF support stage 10 and an SCR support stay 11.

The DPF case 2 is placed and mounted on the DPF base bracket 8.

The SCR catalyst case 3 is placed and mounted on the SCR base bracket 9.

The DPF support stage 10 is provided on an upper portion of the flywheel housing 6, the flywheel housing 6 is a cast placed on a rear end of the cylinder block 12, the DPF support stage 10 is a built-up portion of the flywheel housing 6 by casting, and the DPF base bracket 8 is placed and mounted on the DPF support stage 10.

The flywheel housing 6 is used, together with a connected transmission case, as a main frame of a running fuselage such as a tractor.

An upper end of the SCR support stay 11 is fixed to the SCR base bracket 9, and a lower end of the SCR support stay 11 is fixed to an engine body part 13 located at a position higher than the cylinder block 12.

The engine body part 13 is the intake manifold 24 shown in FIG. 2 and an exhaust gas flange pipe 28 shown in FIG. 3. The exhaust gas flange pipe 28 connects, to each other, an exhaust gas turbine 29a of a supercharger 29 mounted on an upper portion of the exhaust manifold 25 and an exhaust gas introducing pipe 2d of the DPF case 2.

Figure 7:
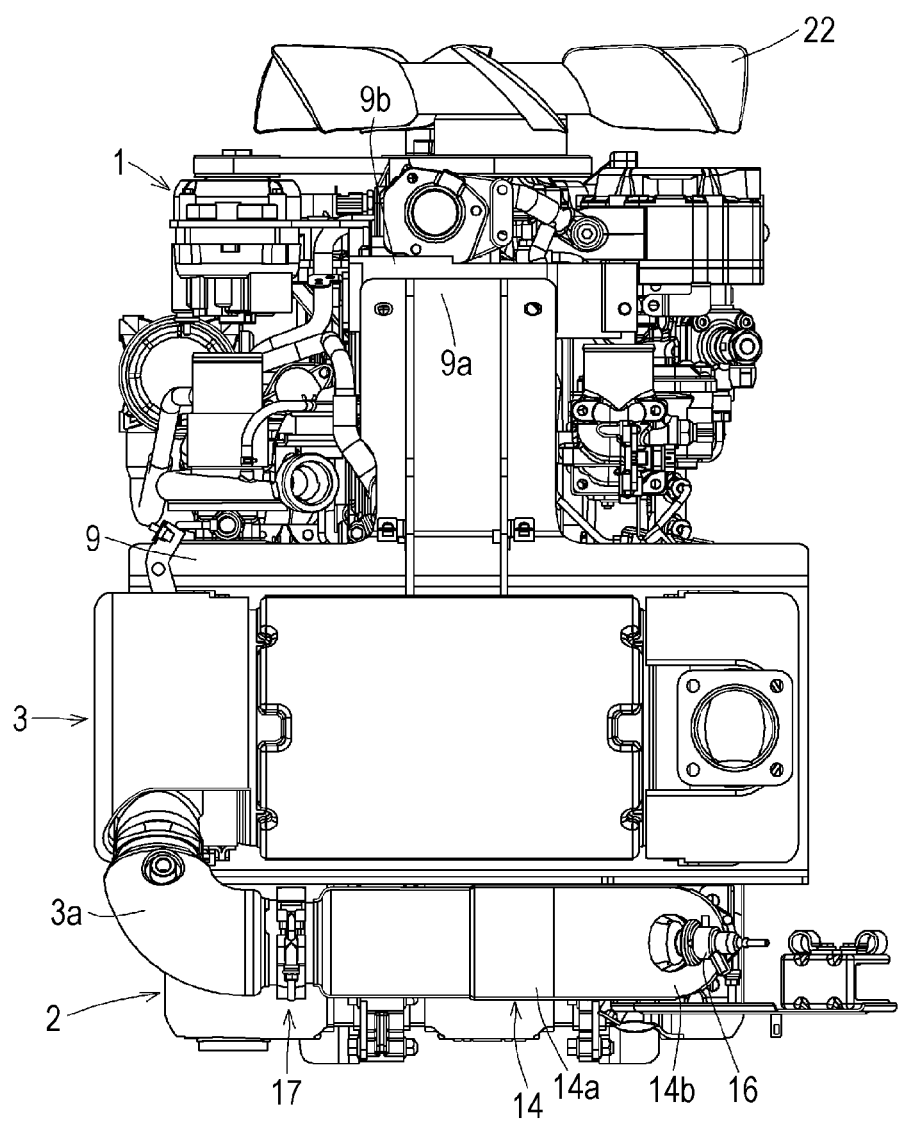
FIG. 7 is a plan view of the engine shown in FIG. 1.
Figure 8:
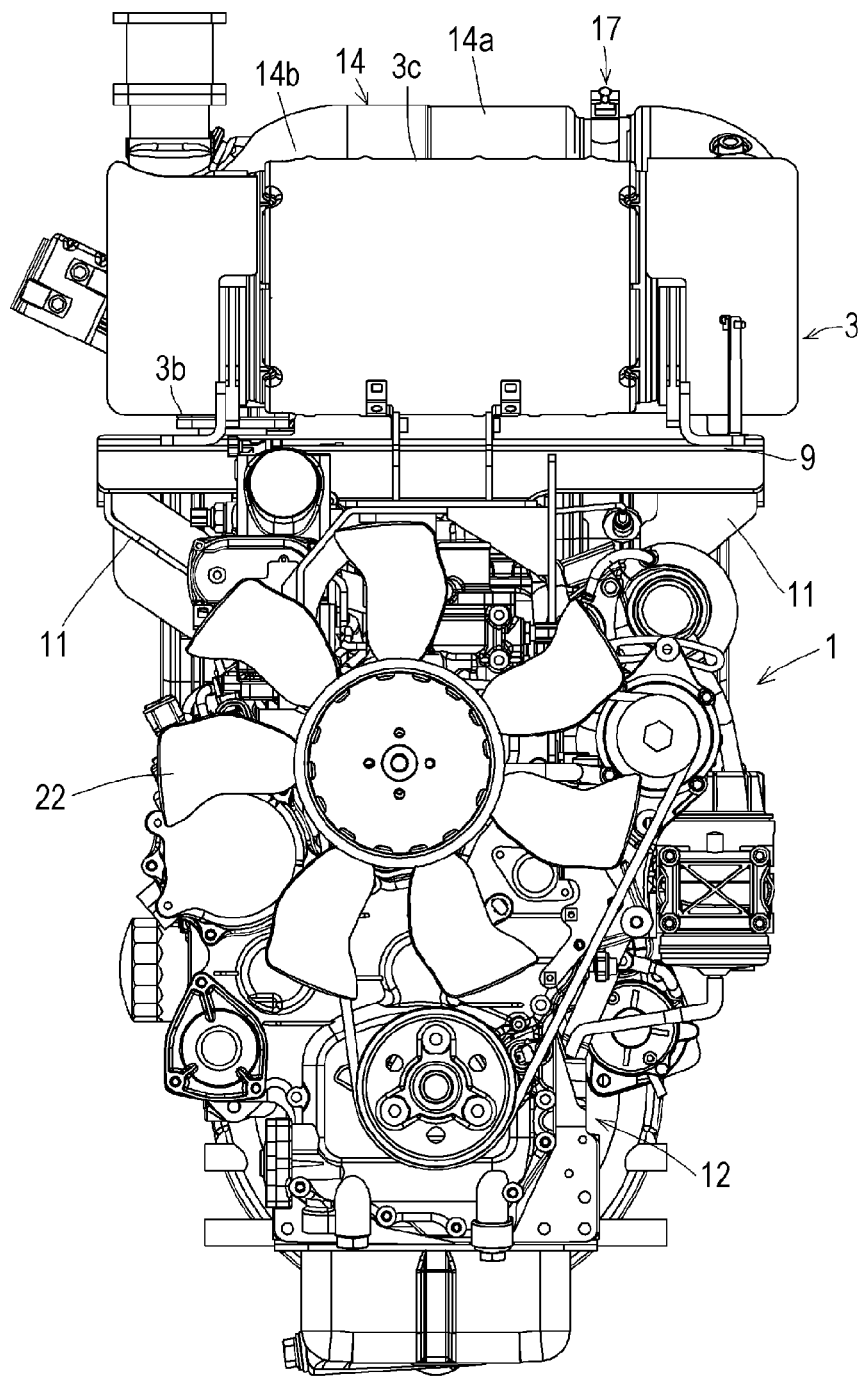
FIG. 8 is a front view of the engine shown in FIG. 1.

As shown in FIG. 7, the SCR base bracket 9 includes a forwardly-extending portion 9a which extends forward, and the forwardly-extending portion 9a is supported by the intake manifold 24 and an engine-hoisting plate 31 through a front support stay 9b. This configuration restrains the SCR base bracket 9 from swinging longitudinally.

Figure 4:
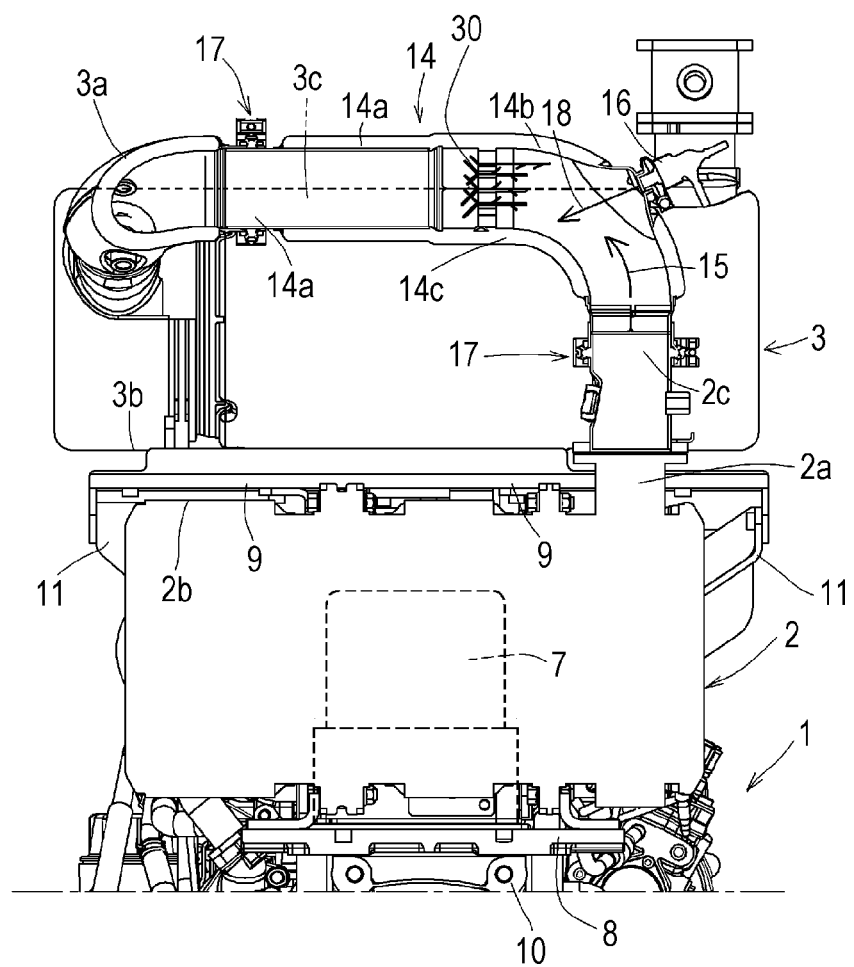
FIG. 4 is a back view of an upper portion of the engine shown in FIG. 1 in which a pipe is partially cut vertically.
Figure 5:
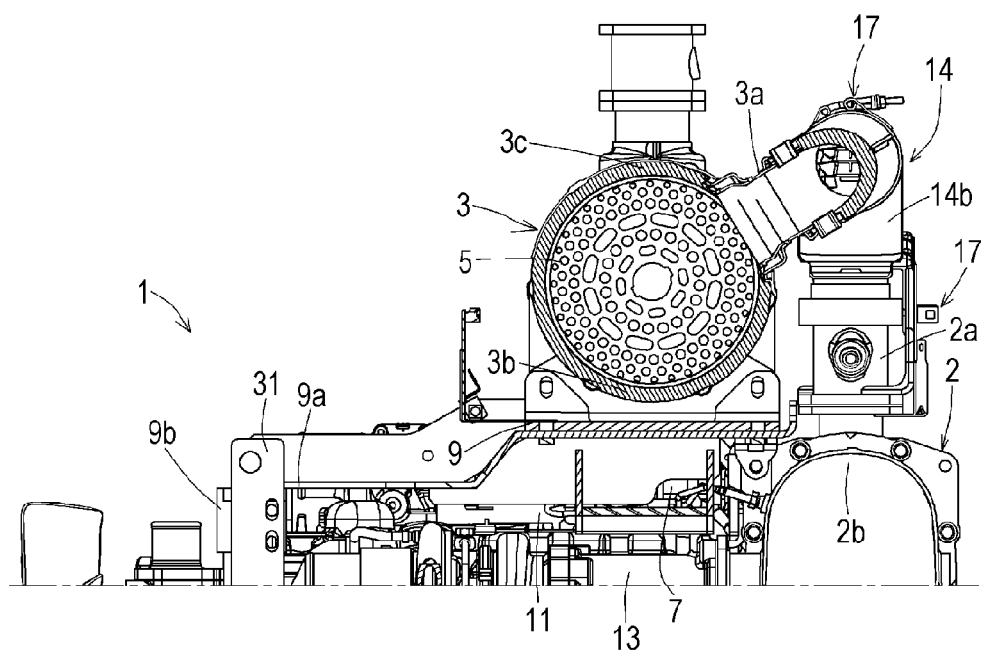
FIG. 5 is a right side view of the upper portion of the engine shown in FIG. 1 in which an SCR catalyst case and an exhaust gas introducing pipe are partially cut vertically.
Figure 6:
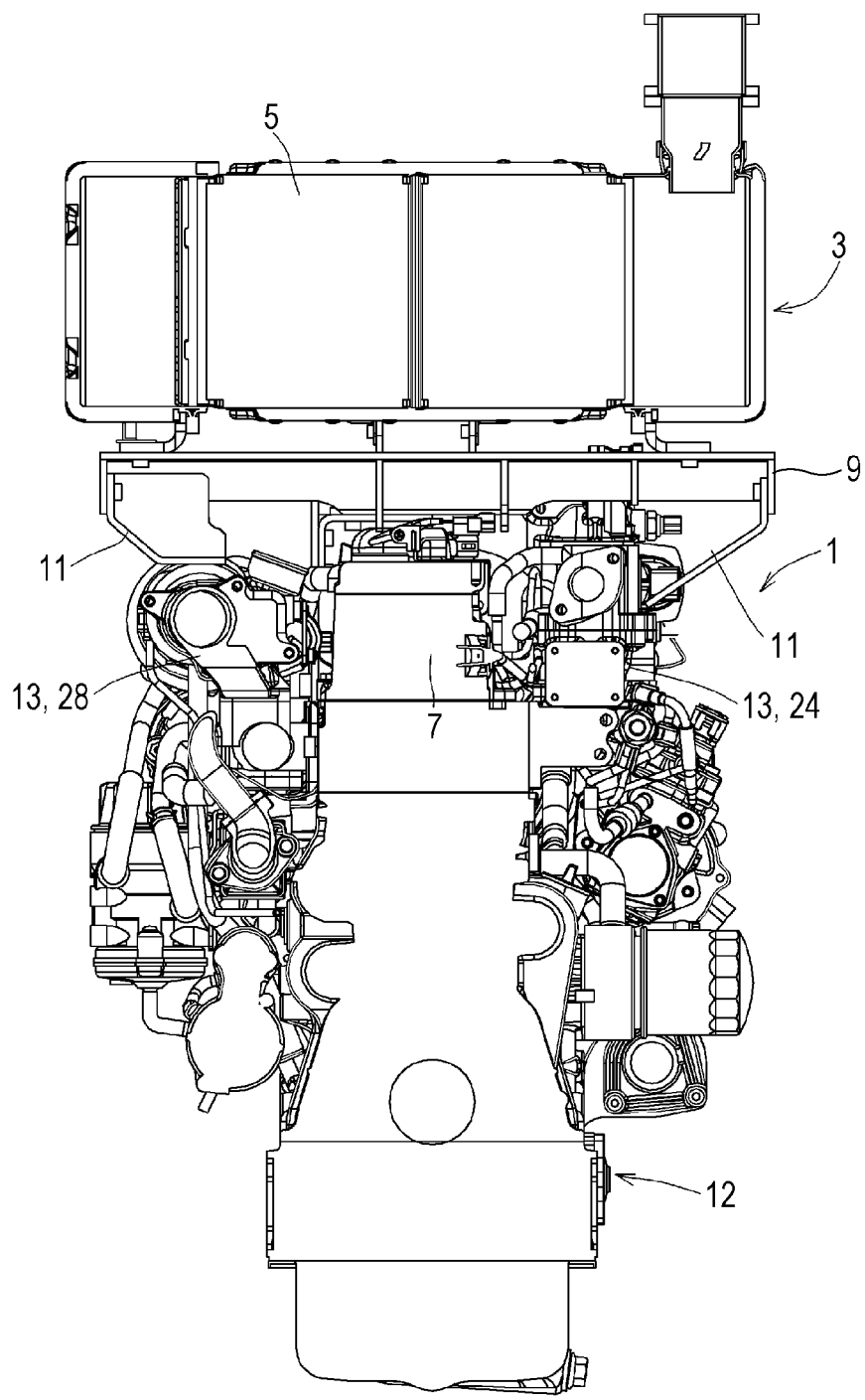
FIG. 6 is a back view of the engine shown in FIG. 1 which is vertically cut at a position of the SCR catalyst case.

As shown in FIG. 4, the diesel engine includes an exhaust gas discharging pipe 2a of the DPF case 2, an exhaust gas introducing pipe 3a of the SCR catalyst case 3, an exhaust gas relay pipe 14 and a urea aqueous solution injector 16.

The exhaust gas relay pipe 14 is interposed between the exhaust gas discharging pipe 2a of the DPF case 2 and the exhaust gas introducing pipe 3a of the SCR catalyst case 3. The urea aqueous solution injector 16 is placed upstream of the exhaust gas relay pipe 14. Exhaust gas 15 sent out from the DPF case 2 and urea aqueous solution 18 injected from the urea aqueous solution injector 16 are mixed with each other in the straight pipe portion 14a of the exhaust gas relay pipe 14.

The straight pipe portion 14a of the exhaust gas relay pipe 14 is placed in a direction which extends along the DPF case 2 and the SCR catalyst case 3.

A mixer plate 30 is provided in the straight pipe portion 14a of the exhaust gas relay pipe 14 to facilitate the mixing operation of the exhaust gas 15 and the urea aqueous solution 18.

As shown in FIG. 7, the straight pipe portion 14a of the exhaust gas relay pipe 14 is placed directly above the DPF case 2.

As shown in FIG. 1, as viewed in a direction parallel to a crankshaft center axis 19 of the engine body 1, a highest portion 2b of a peripheral surface of the DPF case 2 is placed at a position lower than a lowest portion 3b of a peripheral surface of the SCR catalyst case 3, and the straight pipe portion 14a of the exhaust gas relay pipe 14 is placed at a position superposing on a highest portion 3c of the peripheral surface of the SCR catalyst case 3.

As shown in FIG. 1, the diesel engine includes slip joint portions 17. The slip joint portions 17 are placed on both ends of the exhaust gas relay pipe 14.

Figure 9:
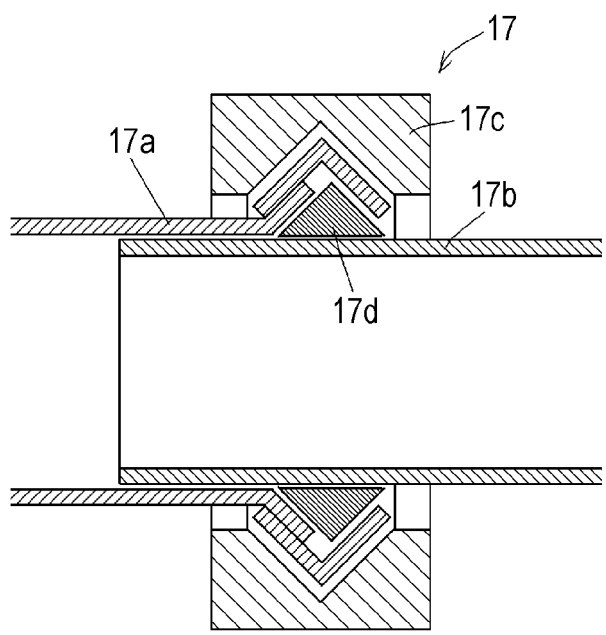
FIG. 9 is a diagram for describing a principle of a slip joint portion used in the engine shown in FIG. 1.

As shown in FIG. 9, a pipe portion 17b of each of the slip joint portions 17 is fitted into a pipe portion 17a of the slip joint portion 17 such that the pipe portions 17a and 17b can expand, contract and slide in a longitudinal direction of the pipe slip joint portion 17 in principle, and the pipe portions 17a and 17b are fixed by a fastening portion 17c at predetermined expansion, contraction and sliding positions.

The fastening portion 17c fastens and fixes the pipe portions 17a and 17b by means of a fastening band. A space between the pipe portions 17a and 17b is sealed by a gasket 17d.

As shown in FIG. 4, the exhaust gas discharging pipe 2a of the DPF case 2 radially extends from a peripheral wall of one end of the DPF case 2.

One of both ends of the SCR catalyst case 3 which is located on the same side as the exhaust gas discharging pipe 2a of the DPF case 2 is defined as one end, and an end opposite from the one end is defined as the other end. The exhaust gas introducing pipe 3a of the SCR catalyst case 3 curves and extends from a peripheral wall of the other end toward the one end.

The exhaust gas relay pipe 14 includes a curved pipe portion 14b and the straight pipe portion 14a. The curved pipe portion 14b is connected to an extending end 2c of the exhaust gas discharging pipe 2a of the DPF case 2, and curves and extends from the extending end 2c of the exhaust gas discharging pipe 2a toward the exhaust gas introducing pipe 3a of the SCR catalyst case 3. The straight pipe portion 14a straightly extends from an extending end 14c of the curved pipe portion 14b toward the exhaust gas introducing pipe 3a of the SCR catalyst case 3. An extending end 14d of the straight pipe portion 14a is connected to the exhaust gas introducing pipe 3a of the SCR catalyst case 3.

Next, a second embodiment will be described.

The second embodiment is different from the first embodiment in the following points.

Figure 10:
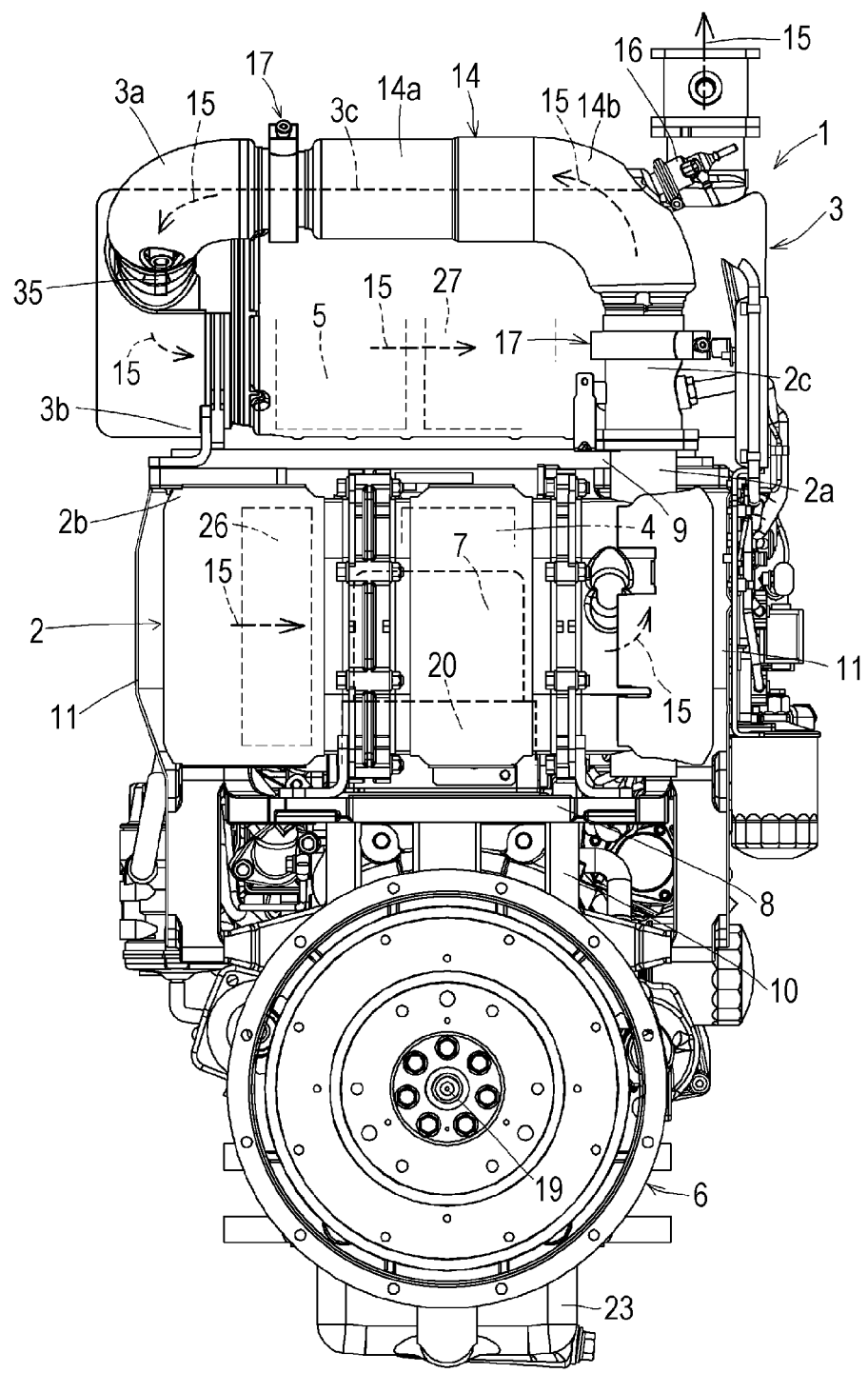
FIG. 10 is a back view of a diesel engine according to a second embodiment of the present invention.
Figure 11:
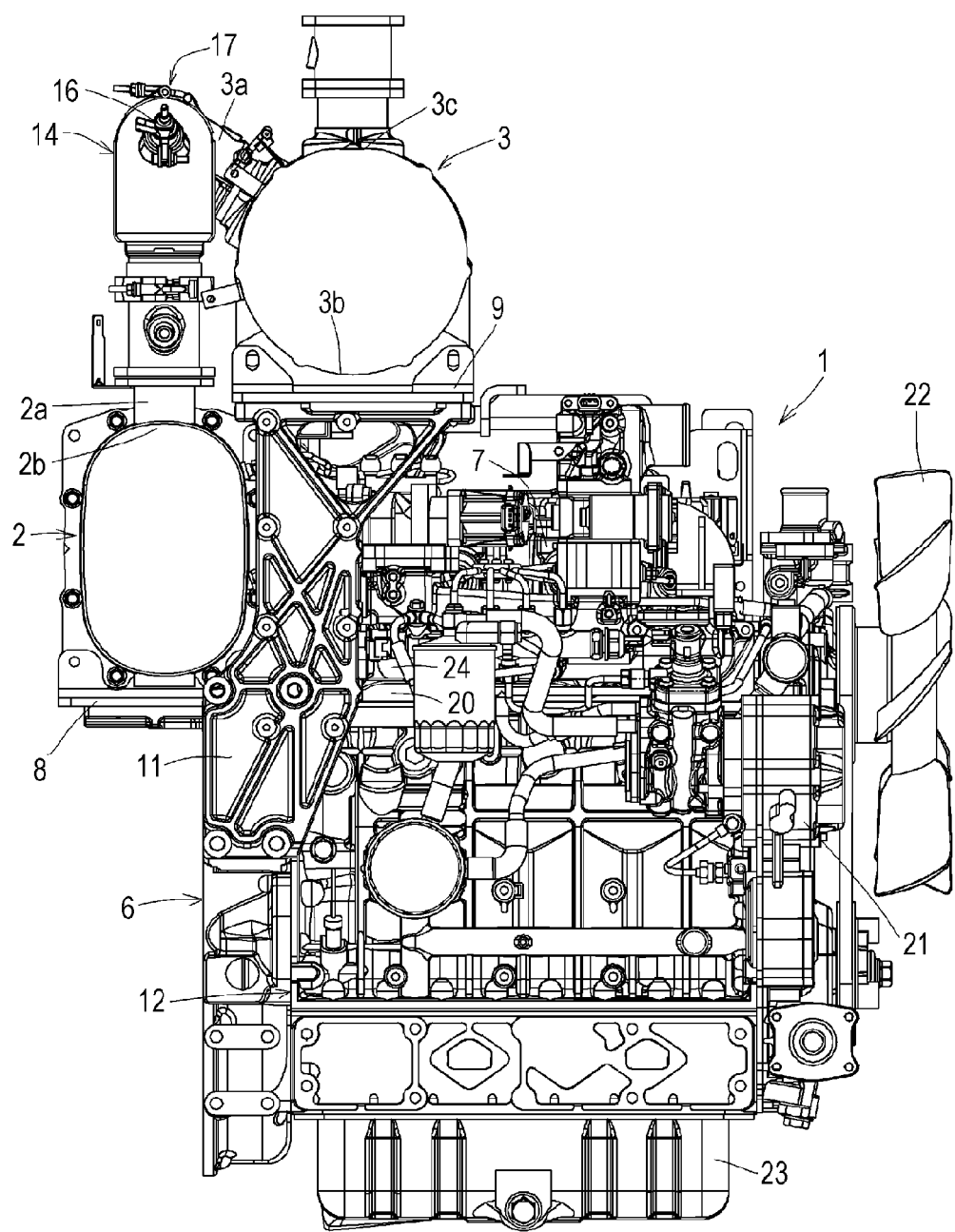
FIG. 11 is a left side view of the engine shown in FIG. 10.
Figure 12:
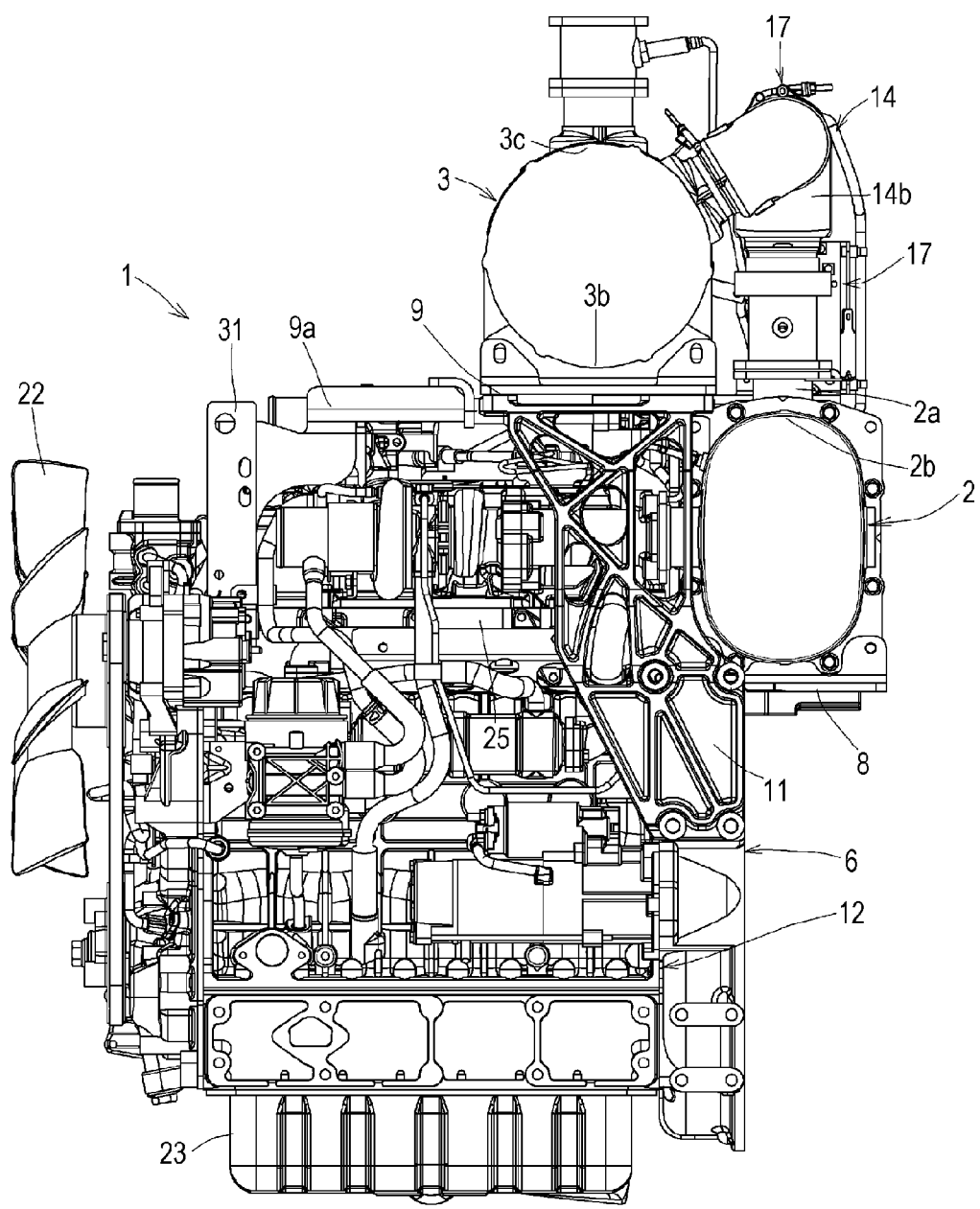
FIG. 12 is a right side view of the engine shown in FIG. 10.
Figure 13:
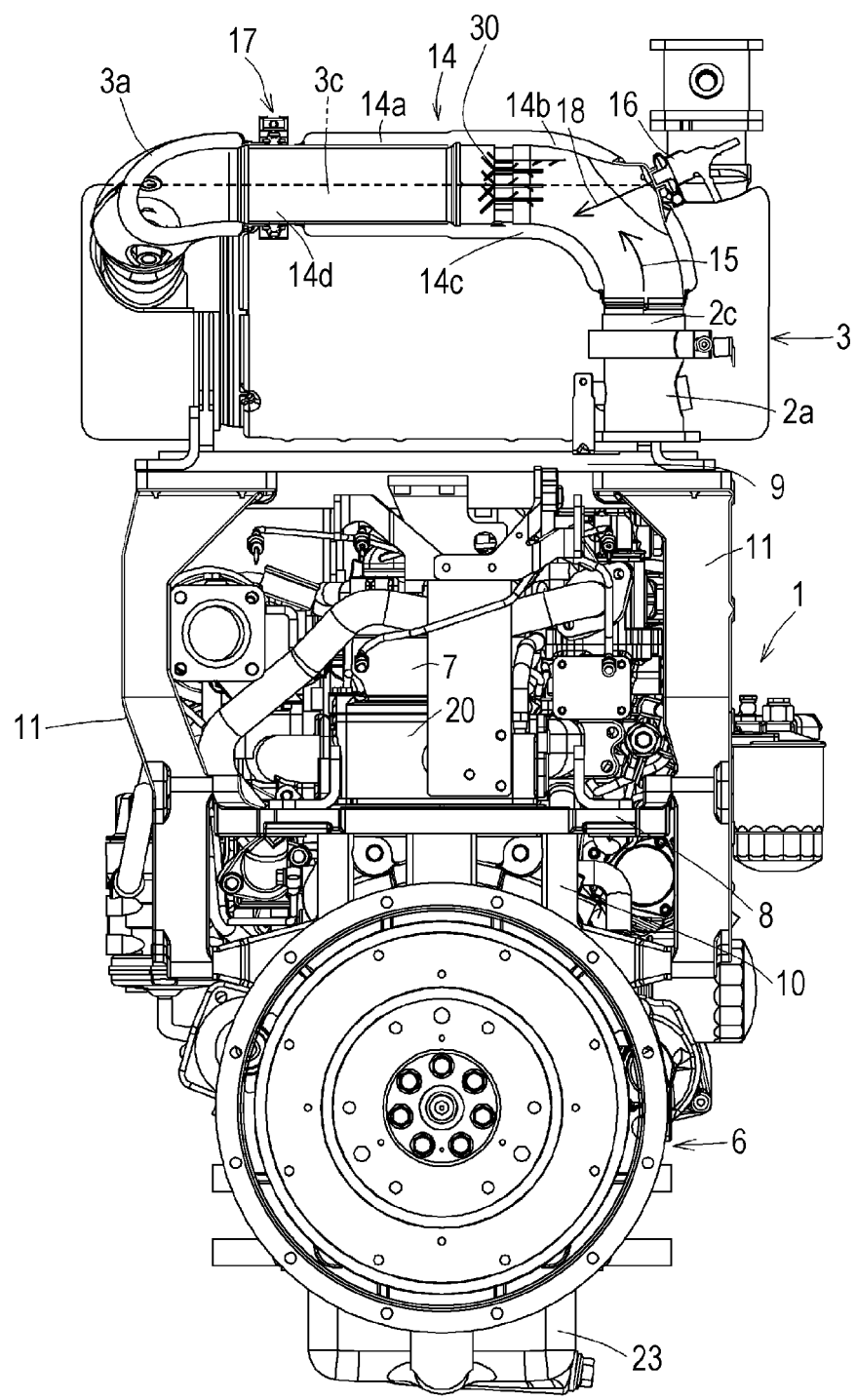
FIG. 13 is a back view of the engine shown in FIG. 10 in which a pipe is partially cut vertically.
Figure 14:
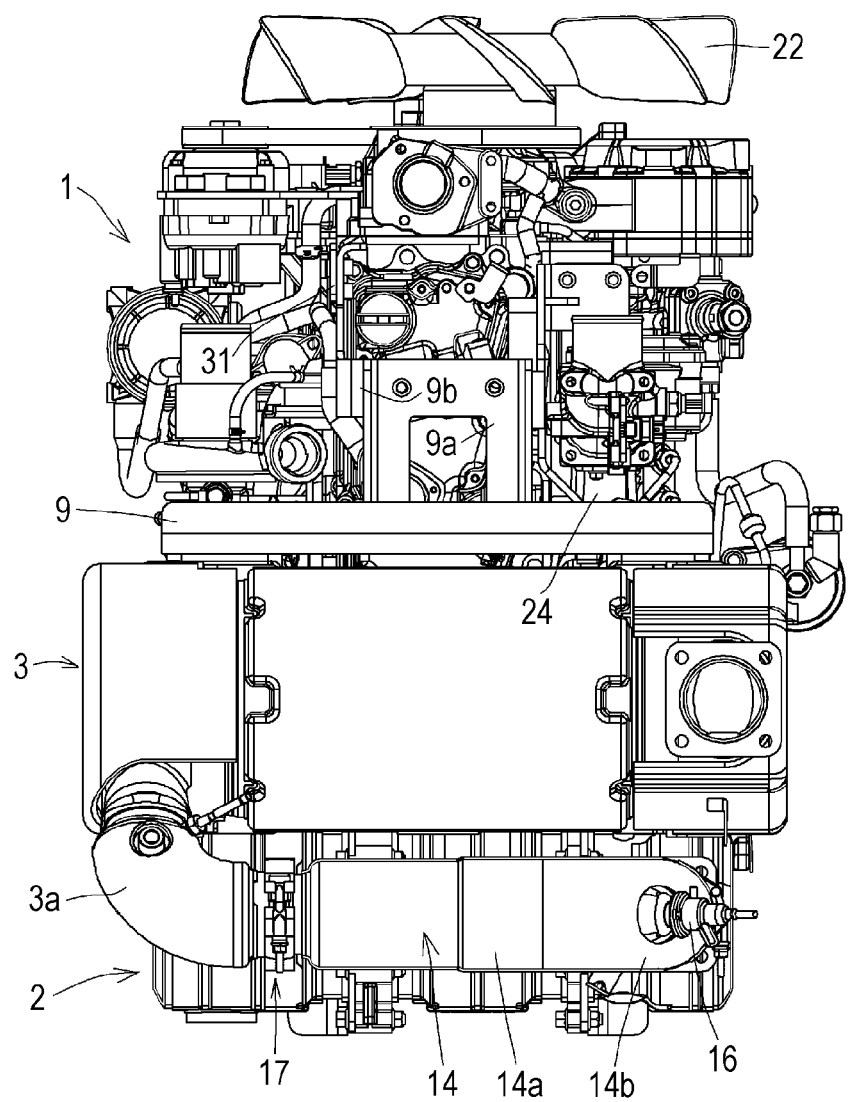
FIG. 14 is a plan view of the engine shown in FIG. 10.
Figure 15:
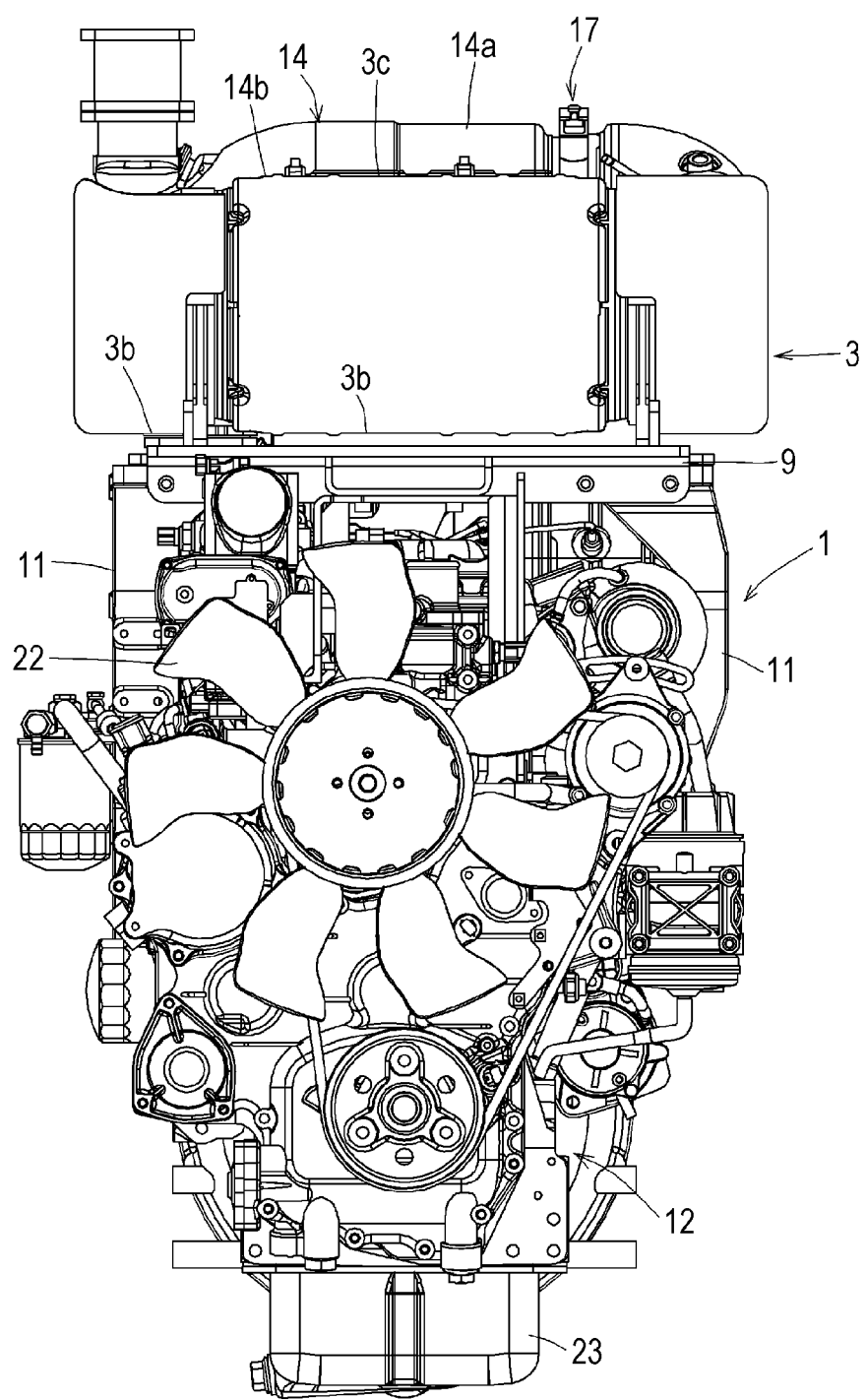
FIG. 15 is a front view of the engine shown in FIG. 10.

As shown in FIGS. 10 to 12, a diesel engine of the second embodiment includes a DPF base bracket 8, an SCR base bracket 9, a DPF support stage 10 and an SCR support stay 11.

A DPF case 2 is placed and mounted on the DPF base bracket 8.

An SCR catalyst case 3 is placed and mounted on the SCR base bracket 9.

The DPF support stage 10 is provided on an upper portion of a flywheel housing 6, the flywheel housing 6 is a cast placed on a rear end of a cylinder block 12, the DPF support stage 10 is a built-up portion of the flywheel housing 6 by casting, and the DPF base bracket 8 is placed and mounted on the DPF support stage 10.

A lower portion of the SCR support stay 11 is fixed to the flywheel housing 6 and the DPF base bracket 8, and the SCR base bracket 9 is fixed to an upper end portion of the SCR support stay 11.

Figure 16:
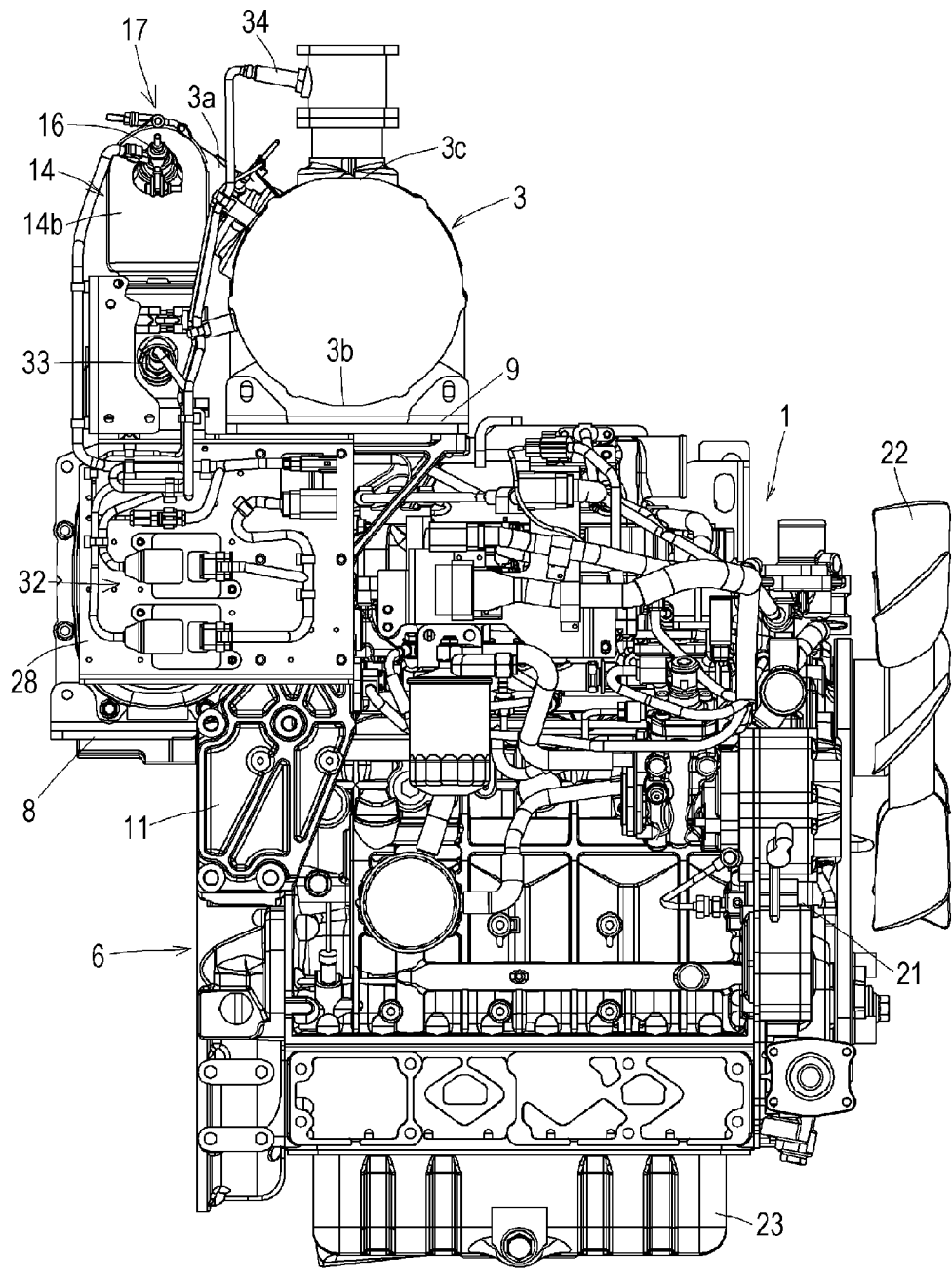
FIG. 16 is a side view of a modification of the engine shown in FIG. 10.

FIG. 16 shows a modification of the second embodiment. In this modification, the following configurations are added to the basic example of the second embodiment shown in FIGS. 10 to 15.

That is, the modification includes a connector mounting plate 28, the connector mounting plate 28 is mounted on an SCR support stay 11, and a connector 32 which is an electronic component is mounted on the connector mounting plate 28.

The connector 32 mounted on the connector mounting plate 28 is for an SCR catalyst 5. The connector 32 is of a urea aqueous solution injector 16, an inlet-side NOx sensor 33, an outlet-side NOx sensor 34 and an exhaust gas temperature sensor 35 shown in FIG. 10.

Other configurations of the basic example of the second embodiment and its modification are the same as those of the first embodiment. In FIGS. 10 to 16, the same reference signs as those shown in FIGS. 1 to 9 are allocated to the same elements as those of the first embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A diesel engine comprising:
an engine body;
a DPF (diesel particulate filter);
an SCR catalyst (selective catalytic reduction catalyst);
a DPF case;
an SCR catalyst case; and
an SCR base bracket, wherein
the DPF is accommodated in the DPF case,
the SCR catalyst is accommodated in the SCR catalyst case,
the DPF case and the SCR catalyst case are mounted on the engine body,
the SCR catalyst case is placed in a direction which extends along the DPF case,
a flywheel housing is placed on a rear end of a cylinder block of the engine body,
a cylinder head cover is placed on an upper portion of a cylinder head of an upper portion of the cylinder block of the engine body,
the DPF case is placed directly above the flywheel housing and right behind the cylinder head cover,
the SCR catalyst case is placed directly above the cylinder head cover,
the SCR catalyst case is placed and mounted on the SCR base bracket, and
the SCR base bracket includes a forwardly-extending portion which extends forward and is supported by an intake manifold through a front support stay.

2. The diesel engine according to claim 1, further comprising:
DPF base bracket:
a DPF support stage and
SCR support stay, wherein
the DPF case is placed and mounted on the DPF base bracket,
the DPF support stage is provided on an upper portion of the flywheel housing,
the flywheel housing is a cast placed on a rear end of the cylinder block,
the DPF support stage is a built-up portion of the flywheel housing by casting,
the DPF base bracket is placed and mounted on the DPF support stage,
an upper end of the SCR support stay is fixed to the SCR base bracket, and
a lower end of the SCR support stay is fixed to an engine body part located at a position higher than the cylinder block.

3. The diesel engine according to claim 2, further comprising:
an exhaust gas discharging pipe of the DPF case;
an exhaust gas introducing pipe of the SCR catalyst case;
an exhaust gas relay pipe; and
a urea aqueous solution injector, wherein
the exhaust gas relay pipe is interposed between the exhaust gas discharging pipe of the DPF case and the exhaust gas introducing pipe of the SCR catalyst case,
the urea aqueous solution injector is placed upstream of the exhaust gas relay pipe,
exhaust gas sent out from the DPF case and urea aqueous solution injected from the urea aqueous solution injector are mixed with each other in a straight pipe portion of the exhaust gas relay pipe, and
the straight pipe portion of the exhaust gas relay pipe is placed in a direction which extends along the DPF case and the SCR catalyst case.

4. The diesel engine according to claim 3, wherein
the straight pipe portion of the exhaust gas relay pipe is placed directly above the DPF case,
as viewed in a direction parallel to a crankshaft center axis of the engine body,
a highest portion of a peripheral surface of the DPF case is placed at a position lower than a lowest portion of a peripheral surface of the SCR catalyst case, and
the straight pipe portion of the exhaust gas relay pipe is placed at a position superposing on a highest portion of the peripheral surface of the SCR catalyst case.

5. The diesel engine according to claim 3, further comprising slip joint portions wherein
the slip joint portions are placed on both ends of the exhaust gas relay pipe,
a second pipe portion is fitted into a first pipe portion such that the first pipe portion and the second pipe portion can expand, contract and slide in a longitudinal direction of the pipe slip joint portion, and
the first pipe portion and the second pipe portion are fixed by a fastening portion at predetermined expansion, contraction and sliding positions.

6. The diesel engine according to claim 2, wherein
the engine body part, to which the lower end of the SCR support stay is fixed, is an intake manifold.

7. The diesel engine according to claim 2, wherein
the engine body part, to which the lower end of the SCR support stay is fixed, is an exhaust gas flange pipe, and
the exhaust gas flange pipe connects, to each other, an exhaust gas turbine of a supercharger mounted on an upper portion of the exhaust manifold and an exhaust gas introducing pipe of the DPF case.

8. The diesel engine according to claim 1, further comprising:
a DPF base bracket;
a DPF support stage; and
an SCR support stay, wherein
the DPF case is placed and mounted on the DPF base bracket,
the DPF support stage is provided on an upper portion of the flywheel housing,
the flywheel housing is a cast placed on a rear end of the cylinder block,
the DPF support stage is a built-up portion of the flywheel housing by casting,
the DPF base bracket is placed and mounted on the DPF support stage,
a lower portion of the SCR support stay is fixed to the flywheel housing and the DPF base bracket, and the SCR base bracket is fixed to an upper end of the SCR support stay.

9. The diesel engine according to claim 8, further comprising a connector mounting plate, wherein
the connector mounting plate is mounted on the SCR support stay, and a connector which is an electronic component is mounted on the connector mounting plate.

10. The diesel engine according to claim 9, further comprising:
an exhaust gas discharging pipe of the DPF case;
an exhaust gas introducing pipe of the SCR catalyst case; and
an exhaust gas relay pipe and a urea aqueous solution injector, wherein
the exhaust gas relay pipe is interposed between the exhaust gas discharging pipe of the DPF case and the exhaust gas introducing pipe of the SCR catalyst case,
the urea aqueous solution injector is placed upstream of the exhaust gas relay pipe,
exhaust gas sent out from the DPF case and urea aqueous solution injected from the urea aqueous solution injector are mixed with each other in a straight pipe portion of the exhaust gas relay pipe, and
the straight pipe portion of the exhaust gas relay pipe is placed in a direction which extends along the DPF case and the SCR catalyst case.

11. The diesel engine according to claim 10, wherein
the straight pipe portion of the exhaust gas relay pipe is placed directly above the DPF case as viewed in a direction parallel to a crankshaft center axis of the engine body,
a highest portion of a peripheral-surface of the DPF case is placed at a position lower than a lowest portion of a peripheral surface of the SCR catalyst case, and
the straight pipe portion of the exhaust gas relay pipe is placed at a position superposing on a highest portion of the peripheral surface of the SCR catalyst case.

12. The diesel engine according to claim 10, further comprising slip joint portions, wherein
the slip joint portions are placed on both ends of the exhaust gas relay pipe,
a second pipe portion is fitted into a first pipe portion such that the first pipe portion and
the second pipe portion can expand, contract and slide in a longitudinal direction of the pipe slip joint portion, and
the first pipe portion and the second pipe portion are fixed by a fastening portion at predetermined expansion, contraction and sliding positions.

13. The diesel engine according to claim 8, further comprising:
an exhaust gas discharging pipe of the DPF case;
an exhaust gas introducing pipe of the SCR catalyst case;
an exhaust gas relay pipe; and
a urea aqueous solution injector, wherein
the exhaust gas relay pipe is interposed between the exhaust gas discharging pipe of the DPF case and the exhaust gas introducing pipe of the SCR catalyst case,
the urea aqueous solution injector is placed upstream of the exhaust gas relay pipe,
exhaust gas sent out from the DPF case and urea aqueous solution injected from the urea aqueous solution injector are mixed with each other in a straight pipe portion of the exhaust gas relay pipe, and
the straight pipe portion of the exhaust gas relay pipe is placed in a direction which extends along the DPF case and the SCR catalyst case.

14. The diesel engine according to claim 13, wherein
the straight pipe portion of the exhaust gas relay pipe is placed directly above the DPF case as viewed in a direction parallel to a crankshaft center axis of the engine body,
a highest portion of a peripheral surface of the DPF case is placed at a position lower than a lowest portion of a peripheral surface of the SCR catalyst case, and
the straight pipe portion of the exhaust gas relay pipe is placed at a position superposing on a highest portion of the peripheral surface of the SCR catalyst case.

15. The diesel engine according to claim 13, further comprising slip joint portions, wherein
the slip joint portions are placed on both ends of the exhaust gas relay pipe,
a second pipe portion is fitted into a first pipe portion such that the first pipe portion and the second pipe portion can expand, contract and slide in a longitudinal direction of the pipe slip joint portion, and
the first pipe portion and the second pipe portion are fixed by a fastening portion at predetermined expansion, contraction and sliding positions.

16. The diesel engine according to claim 1, further comprising:
an exhaust gas discharging pipe of the DPF case;
an exhaust gas introducing pipe of the SCR catalyst case;
an exhaust gas relay pipe; and
a urea aqueous solution injector, wherein
the exhaust gas relay pipe is interposed between the exhaust gas discharging pipe of the DPF case and the exhaust gas introducing pipe of the SCR catalyst case,
the urea aqueous solution injector is placed upstream of the exhaust gas relay pipe,
exhaust gas sent out from the DPF case and urea aqueous solution (18) injected from the urea aqueous solution injector are mixed with each other in a straight pipe portion of the exhaust gas relay pipe, and
the straight pipe portion of the exhaust gas relay pipe is placed in a direction which extends along the DPF case and the SCR catalyst case.

17. The diesel engine according to claim 16, wherein
the straight pipe portion of the exhaust gas relay pipe is placed directly above the DPF case, as viewed in a direction parallel to a crankshaft center axis of the engine body,
a highest portion of a peripheral surface of the DPF case is placed at a position lower than a lowest portion of a peripheral surface of the SCR catalyst case, and
the straight pipe portion of the exhaust gas relay pipe is placed at a position superposing on a highest portion of the peripheral surface of the SCR catalyst case.

18. The diesel engine according to claim 16, further comprising slip joint portions, wherein
the slip joint portions are placed on both ends of the exhaust gas relay pipe,
a second pipe portion is fitted into a first pipe portion such that the first pipe portion and the second pipe portion can expand, contract and slide in a longitudinal direction of the pipe slip joint portion, and
the first pipe portion and the second pipe portion are fixed by a fastening portion at predetermined expansion, contraction and sliding positions.

19. The diesel engine according to claim 16, wherein
the exhaust gas discharging pipe of the DPF case radially extends from a peripheral wall of one end of the DPF case, one of both ends of the SCR catalyst case which is located on the same side as the exhaust gas discharging pipe of the DPF case is defined as one end, and an end opposite from the one end is defined as the other end, the exhaust gas introducing pipe of the SCR catalyst case curves and extends from a peripheral wall of the other end toward the one end, the exhaust gas relay pipe includes a curved pipe portion and the straight pipe portion, the curved pipe portion is connected to an extending end of the exhaust gas discharging pipe of the DPF case, and curves and extends from the extending end of the exhaust gas discharging pipe toward the exhaust gas introducing pipe of the SCR catalyst case, the straight pipe portion straightly extends from an extending end of the curved pipe portion toward the exhaust gas introducing pipe of the SCR catalyst case, and an extending end of the straight pipe portion is connected to the exhaust gas introducing pipe of the SCR catalyst case.

20. The diesel engine according to claim 1, wherein the forwardly-extending portion is also supported by an engine-hoisting plate through the front support stay.

\* \* \* \* \*